United States Patent
Bhalla et al.

(10) Patent No.: US 10,394,767 B2
(45) Date of Patent: Aug. 27, 2019

(54) COMPUTING NETWORK NODE ADJUSTMENTS

(71) Applicant: ORACLE INTERNATIONAL CORPORATION, Redwood Shores, CA (US)

(72) Inventors: Amit Bhalla, Gurgaon (IN); Parag Awadhiya, Durg (IN); Arun Tiwari, Gurgaon (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 1280 days.

(21) Appl. No.: 13/826,042

(22) Filed: Mar. 14, 2013

(65) Prior Publication Data
US 2014/0280205 A1 Sep. 18, 2014

(51) Int. Cl.
*G06F 17/00* (2019.01)
*G06F 16/21* (2019.01)

(52) U.S. Cl.
CPC .................. *G06F 16/211* (2019.01)

(58) Field of Classification Search
None
See application file for complete search history.

(56) References Cited

U.S. PATENT DOCUMENTS

| | | | | |
|---|---|---|---|---|
| 8,052,426 B2* | 11/2011 | Snyder | ............. | G06Q 10/06311 434/365 |
| 2007/0156718 A1* | 7/2007 | Hossfeld et al. | ............. | 707/100 |
| 2010/0287208 A1* | 11/2010 | Mao et al. | ..................... | 707/803 |
| 2011/0212430 A1* | 9/2011 | Smithmier et al. | ........... | 434/322 |
| 2012/0231437 A1* | 9/2012 | Fakhrai | ........................ | 434/350 |

* cited by examiner

*Primary Examiner* — Usmaan Saeed
*Assistant Examiner* — Paul Kim
(74) *Attorney, Agent, or Firm* — Kilpatrick Townsend & Stockton, LLP (57) ABSTRACT

A method of computing relative rankings for multiple course trajectories may include accessing a data structure. The data structure may include a first node that may represent a first course and a plurality of nodes that may represent courses that are available after completing the first course. Each of the plurality of nodes may be associated with a weight, and the plurality of nodes may include a second node representing a second course. The method may also include receiving a first grade for a student for the first course and receiving a second grade for the student for the second course. The method may additionally include adjusting the weight associated with the second node using the first grade and the second grade. The method may further include providing a ranking of the plurality of courses using the weights of the plurality of courses.

20 Claims, 8 Drawing Sheets

COMPUTING NETWORK NODE ADJUSTMENTS

BACKGROUND

Modern school environments often use Enterprise Software Systems (ESS) to manage student data, course offerings, curriculums, and scheduling. These software tools enable teachers to prepare, manage, and deliver learning tools and resources within and across school boundaries. Teachers can also assess, monitor, and manage learning pathways for each student and report real time progress and provide feedback to parents and school administrators. More importantly, students are able to view their own learning plans and generate specific task outlines. Electronic journals allow participation in online discussions. Students are also able to communicate with teachers online, collaborate with classmates, and receive ongoing feedback.

BRIEF SUMMARY

In one embodiment, a method of computing relative rankings for multiple course trajectories may be presented. The method may include accessing a data structure. The data structure may include a first node that may represent a first course and a plurality of nodes that may represent courses that are available after completing the first course. Each of the plurality of nodes may be associated with a weight, and the plurality of nodes may include a second node representing a second course. The method may also include receiving a first grade for a student for the first course and receiving a second grade for the student for the second course. The method may additionally include adjusting the weight associated with the second node using the first grade and the second grade. The method may further include providing a ranking of the plurality of courses using the weights of the plurality of courses.

In some embodiments, the data structure may include a tree data structure that is organized into a plurality of parent-child relationships. Each of the plurality of nodes may be a child of the first node. The course represented by the first node may include a prerequisite for each of the courses represented by the plurality of nodes. In some embodiments, adjusting the weight may include determining that the first grade is higher than the second grade and reducing the weight associated with the second node. In some embodiments, adjusting the weight may include determining that the first grade is lower than the second grade and increasing the weight associated with the second node.

In some embodiments, the method may also include using a balancing factor to adjust the weight associated with the second node. The method may additionally include initializing the weights associated with each of the plurality of nodes to 0. The method may further include causing the courses associated with each of the plurality of nodes to be displayed in an order based on the rankings. The method may also include determining that no students have enrolled in a third course associated with a third node, and causing an indication to be displayed communicating that no students have enrolled in the third course instead of displaying the weight associated with the third node.

In another embodiment, a computer-readable memory may be presented. The computer-readable memory may comprise a sequence of instructions which, when executed by one or more processors, causes the one or more processors to compute relative rankings for multiple course trajectories. The instructions may cause the processor(s) to access a data structure. The data structure may include a first node that may represent a first course and a plurality of nodes that may represent courses that are available after completing the first course. Each of the plurality of nodes may be associated with a weight, and the plurality of nodes may include a second node representing a second course. The instructions may also cause the processor(s) to receive a first grade for a student for the first course and receive a second grade for the student for the second course. The instructions may additionally cause the processor(s) to adjust the weight associated with the second node using the first grade and the second grade. The instructions may further cause the processor(s) to provide a ranking of the plurality of courses using the weights of the plurality of courses.

In yet another embodiment, a system may be presented. The system may include one or more processors and a memory communicatively coupled with and readable by the one or more processors. The memory may comprise a sequence of instructions which, when executed by the one or more processors, cause the one or more processors to compute relative rankings for multiple course trajectories. The instructions may cause the processor(s) to access a data structure. The data structure may include a first node that may represent a first course and a plurality of nodes that may represent courses that are available after completing the first course. Each of the plurality of nodes may be associated with a weight, and the plurality of nodes may include a second node representing a second course. The instructions may also cause the processor(s) to receive a first grade for a student for the first course and receive a second grade for the student for the second course. The instructions may additionally cause the processor(s) to adjust the weight associated with the second node using the first grade and the second grade. The instructions may further cause the processor(s) to provide a ranking of the plurality of courses using the weights of the plurality of courses.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
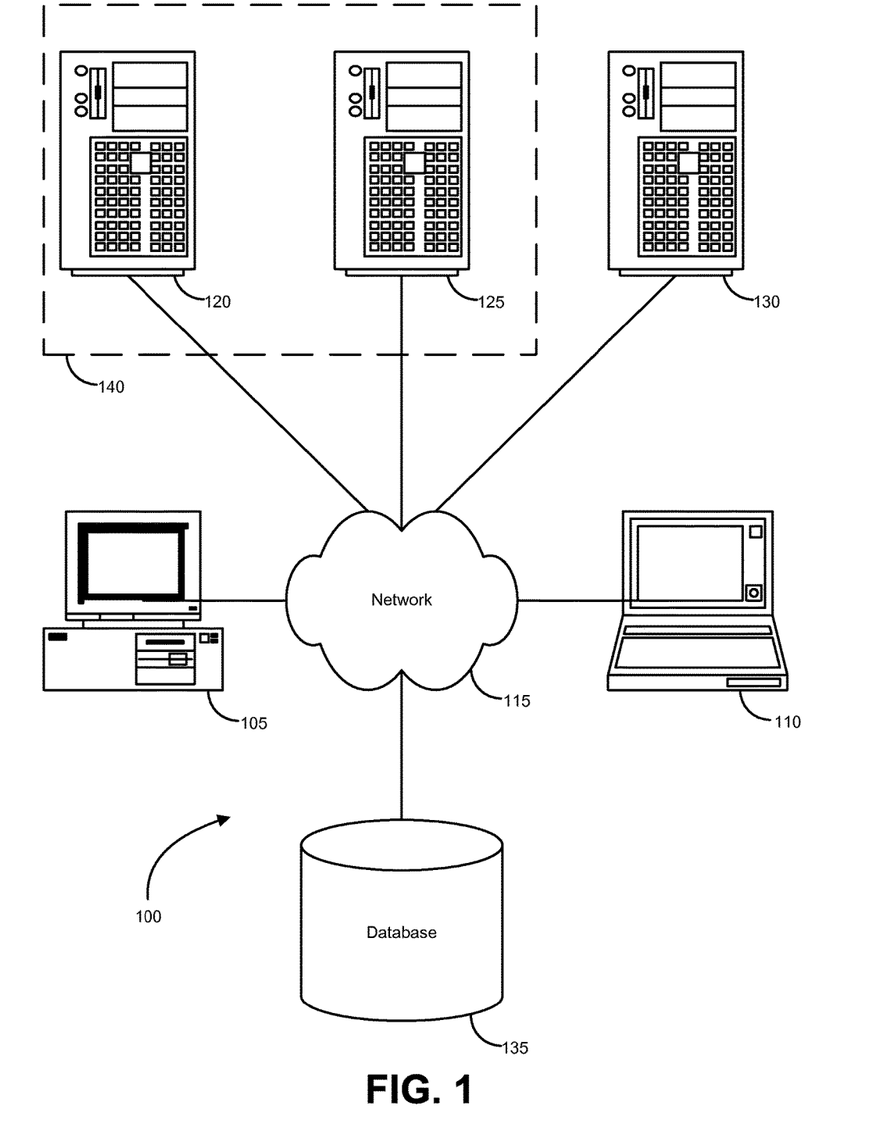
FIG. 1 illustrates a block diagram of components of an exemplary operating environment in which various embodiments of the present invention may be implemented.

Each of the embodiments disclosed herein may be implemented in a general-purpose computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
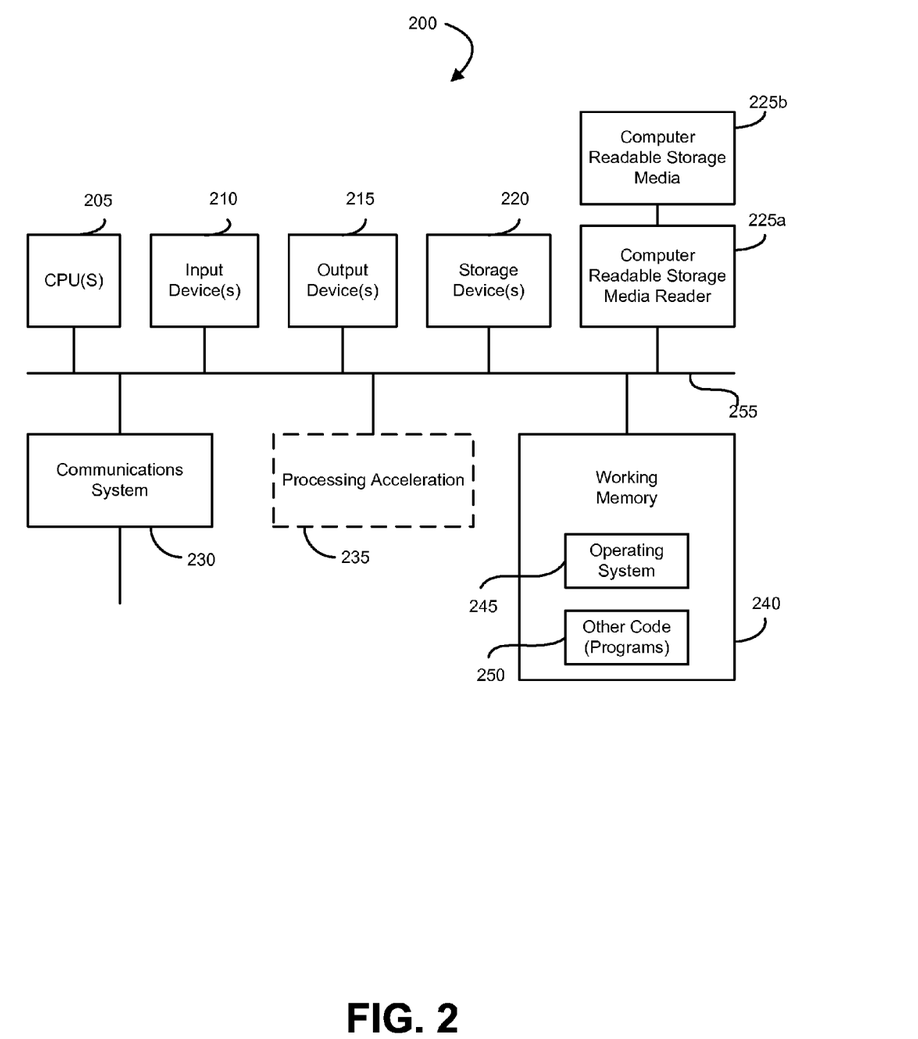
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Described herein, are embodiments for computing network node adjustments for node networks representative of course offerings. Course offerings may be organized into a data structure that represents an availability of each course relative to courses previously taken by a student. Each course may receive a weight that is indicative of student success when following a particular course trajectory. As student grades are received for these courses, the weights of each course may be adjusted to reflect actual data from student learning trajectories. As the weights are updated, rankings may be provided for each course to help students select future courses based on the recorded successes or failures of previous students.

The systems and methods described herein may allow a student to choose the best curriculum path based on the experiences of other students. Multiple paths from the same starting point course may be analyzed to make a recommendation of a course trajectory. Pathways that increase the proficiency of students are weighted higher, while pathways that decrease the proficiency of students are weighted lower. Multiple individual students may contribute to a single weight for each course, and students may be separately modeled to best meet the needs of each individual student. Ultimately, students may be able to view a provided course ranking to intelligently choose the best path forward.

Figure 3:
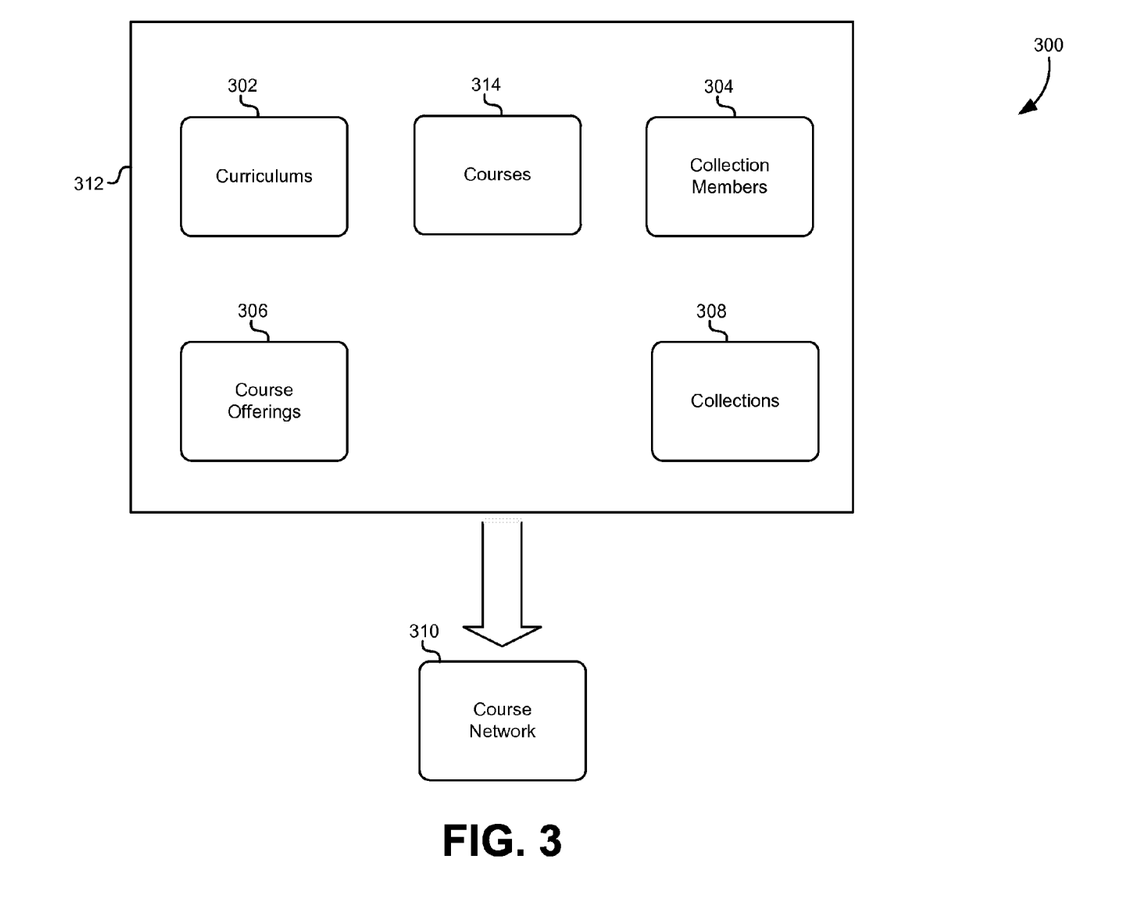
FIG. 3 illustrates a block diagram of a course network creation system, according to one embodiment.

FIG. 3 illustrates a block diagram 300 of a course network creation system, according to one embodiment. The course network creation system may include, or be communicatively coupled to, a student learning system 312, such as the Oracle Student Learning (OSL) product available from Oracle® Corporation. A student learning system 312 may provide a number of different functions to aid both students and teachers in the learning process.

In some embodiments, the student learning system 312 may allow students to view real-time feedback and course information. Grades may be provided by teachers or administrators and made available online to students and parents. Course syllabuses and materials may be posted and available for student groups. Teachers can share learning plans and evaluate these plans using actual student outcomes and government provided standards. Reports may be provided in real-time on student progress to parents and school administrators to analyze each student individually. Automatic communication may provide continuous feedback to parents using e-mail, text messaging, or other technologies.

Student services provided by the student learning system 312 may include course registration and research, electronic notetaking and journal maintenance, as well as online discussion forums with teachers and other students. Course work can be completed and submitted to teachers directly, and digital objects and resources required to complete course assignments may be provided. Students can track their own progress in classes and degree programs and communicate with teachers online. Students can also communicate and collaborate with fellow students or student groups to encourage synergistic learning environments.

The student learning system 312 may also allow parents to communicate directly with teachers. Parents can view their children's lesson plans and course progress. Parents can view their children's homework assignments, due dates, and submitted work. This may provide greater transparency of their child's learning environment and encourage parental involvement in their child's education.

School leaders and administrators can also view what is happening in classrooms in real-time using the student learning system 312. Mentoring and professional development may be provided and monitored to develop a coherent pedagogy. School leaders may also use the student learning system 312 to identify at-risk students and coordinate early interventions. Large-scale learning programs can also be evaluated periodically to determine their effectiveness.

In some embodiments, the student learning system 312 may include specific databases of information that may be used to generate a course network 310. For example, some embodiments may include a curriculums database 302 that includes one or more curriculums. A curriculum may include a set of courses offered at a school or university. Curriculums may also detail a set of courses or learning requirements for a governmental district, such as a state or country. A curriculum may include courses required for a degree, courses required to meet state requirements, or courses required for a particular award or designation. A curriculum may also include learning requirements not dependent on specific courses. For example, a curriculum may include a requirement that a certain level of reading competency be attained.

In some embodiments, the student learning system may also include a course database 314 that describes courses offered by a school, district, or university. The course database 314 may include links to particular items in the curriculums database 302 that are fulfilled by each course. Courses described in the course database 314 may include a syllabus, learning objectives, and other specific requirements that will be fulfilled by the particular course.

In some embodiments, the student learning system 312 may also include a course offering database 306 that describes particular offerings of courses found in the course database 314. A course offering may be regarded as a specific instantiation of a particular course. A course offering may include a specific teacher, a textbook requirement, a time, a date, a location, and/or the like. For example, a course may describe a general calculus course, whereas a course offering may describe a particular offering of the general calculus course taught by a particular teacher from 10:00 AM to 11:00 AM on Monday, Wednesday, and Friday, using a particular textbook.

In some embodiments, the student learning system 312 may also include a collection members database 304. The collection members database 304 may comprise a student database. The collection members database 304 may include one or more collections of people that can be defined for courses, core groups, home groups, learning plan groups, learning item groups, and so forth. The collections database 308 may include individual student records, student histories, grade histories, and other student information.

In some embodiments, the student learning system 312 may also include a collections database 308 that specifies defined collections. For example, a particular collection might include students enrolled in a particular course. Another collection might include students being taught by particular teacher. Another collection might include teachers employed by a university, another collection might include students enrolled in a particular major, and so forth.

One or more of the databases provided by the student learning system 312 may be used to generate the course network 310. For example, a curriculum provided by a state educational agency may be retrieved from the curriculums database 302 and matched with particular course offerings 306 such that respective courses from the courses database 314 fulfill a curriculum. Collections may be identified from the collections database 308 that correspond to students, teachers, or other groups associated with the course offerings, and grade histories for each member of the collection may be retrieved from the collection members database 304. The particular course offerings and the grades of students associated with the particular course offerings may then be used to generate a course network 310 with weights.

Figure 4:
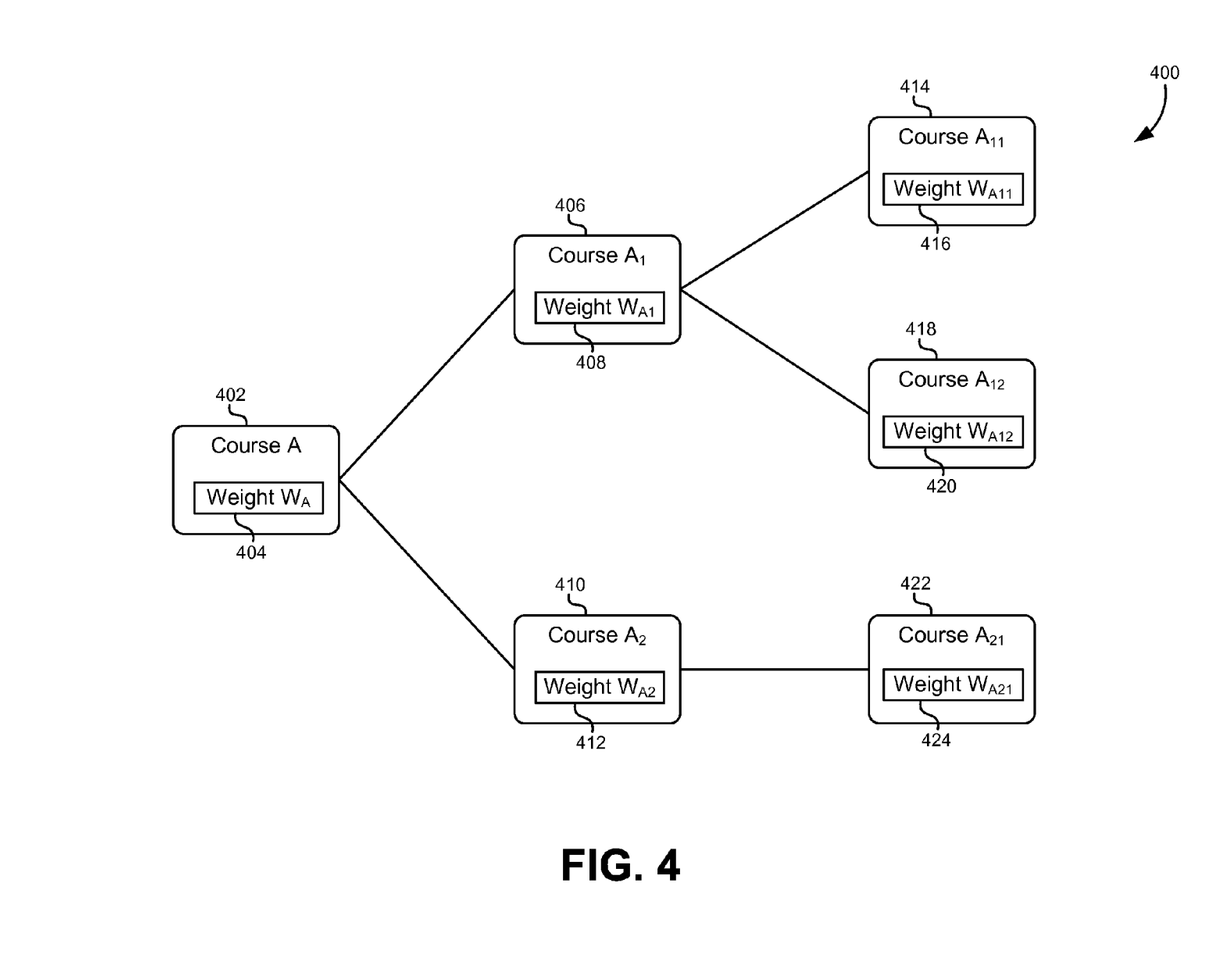
FIG. 4 illustrates a block diagram of a data structure representing a plurality of courses, according to one embodiment.

FIG. 4 illustrates a block diagram 400 of a data structure representing a plurality of courses, according to one embodiment. The plurality of courses may form the course network described above. In some embodiments, the data structure may comprise a tree data structure, such as a binary tree, and OST tree, a red/black tree, and/or the like. Other embodiments may implement the data structure using a relational database with entries in various tables representing courses and weights, with relational links to other tables or table entries.

In some embodiments, the data structure may comprise a plurality of nodes. As used herein, the term nodes may refer to any memory element or group a memory elements used to represent a course in a course network. For example, a node may include an instance of a course representing a course data structure. The data elements of the node may define a particular course offering represented by the node. As used herein, a node in the course offering represented by the node may be used interchangeably in various descriptions. For example, a weight may be adjusted for a node or for a course interchangeably. In FIG. 4, "Course A" may be referred to as "Course A", course 402, and/or node 402 interchangeably.

In some embodiments, one or more of the nodes in the course network data structure may be associated with a weight. As used herein, a weight may represent the relative success of students taking a particular course in the course network. A weight that is associated with a node may be stored as part of the node, or may otherwise be associated with the node by a memory link, pointer, and/or reference. For example, node 402 may be associated with weight 404. Similarly, nodes 406, 410, 414, 418, and 422 may be associated with weights 408, 412, 416, 420, and 424, respectively.

In some embodiments, the data structure may be organized into a plurality of parent-child relationships. For example, node 402 may be considered a parent of both node 406 and node 410. Some embodiments may allow for any number of child nodes. For example, node 410 has a single child, namely node 422. Node 406 has two children, namely node 414 and node 418. Nodes 414, 418, and 422 may have no child nodes.

In some embodiments, parent nodes may represent prerequisites, or courses that are required to be satisfactorily completed before a student may be enrolled in a course represented by a child node. For example, a student may be required to satisfactorily complete "Course A" represented by node 402 before the student is allowed to enroll in the courses represented by node 406 or node 410. In other embodiments, parent nodes may represent recommended courses that should be satisfactorily completed before enrolling in courses represented by child nodes. In other embodiments, parent nodes may represent courses having similar subject matter to the that of courses represented by child nodes. Generally, embodiments may form a course network using a trajectory of recommended courses to fulfill a particular curriculum, such as requirements for a university degree. For example, node 402 may represent an introductory chemistry course for a chemistry major. Node 406 may represent a second-year chemistry course, and node 410 may represent an organic chemistry course. The introductory chemistry course may be a prerequisite or recommended course for both the second-year chemistry course and organic chemistry course. Course 414 may represent a quantum chemistry course, while course 418 may represent a third-year chemistry course. Course 422 may represent an advanced organic chemistry course.

Although not shown explicitly in FIG. 4 for clarity, the course network may include multiple parent-child relationships that include complicated intersections. For example, node 418 may be a child of both node 406 and node 410, and thus multiple parents may be allowed. Similarly, relationships may skip generations within the course network. For example, node 418 may be a child of both node 406 as well as node 402. It should be noted that in some embodiments only single-parent relationships may be allowed.

A weight associated with a particular node may represent the relative success experienced by students enrolling in the course represented by the node compared to the success experienced in a parent course. This allows students completing a particular course to view the next courses available and determine which course will provide the greatest opportunity for success. This also allows administrators and teachers to identify problematic courses for which more prerequisites may be required.

For example, weight 408 associated with node 406 may be considerably higher than weight 412 associated with the node 410. A student completing the course represented by node 402 may be provided with a ranking that displays weight 408, weight 412, along with weights associated with any other available courses. The student could then decide to enroll in the course represented by node 406 because weight 408 is higher than weight 412, indicating that students following the course trajectory from node 402 to node 406 were more successful than students following the course trajectory from node 402 to node 410.

Continuing with this same example, school administrators may compare weight 408 to weight 412 and determine that the difference between the two weights exceeds a threshold value. After exceeding this threshold, school administrators may insert a node representing an intermediate course between node 402 and node 410, thus providing more instruction prior to students enrolling in course 410. Alternatively or additionally, school administrators could analyze the details of various course offerings associated with node 410 to determine that certain teachers, teaching styles, textbooks, times, and/or locations may be more effective than others. School administrators could also alter the requirements, syllabus, testing procedures, subject matter, and/or the like, for the course represented by node 406 to increase their difficulty. Similarly, the course represented by node 410 may be adjusted to decrease its difficulty. In some embodiments, the computer system calculating the weights may may automatic recommendations for new classes, specific teachers, curriculum adjustments, and/or the like.

In some embodiments, a course network such as that shown in FIG. 4 may be developed for each student type. In other embodiments, a single course network may be created, and the data therein may be searchable, editable, and analyzable based on student type. Students may be grouped into various types based on major, minor, academic program, test scores, age, gender, nationality, race, commuting distance, graduate or undergraduate status, work experience, and/or any other type of characteristic that may be imputed to a student. This may allow further personalization of the course ranking provided by the course network. For example, using the entire student population as a group may produce a ranking that recommends a first course over a second course. However, when producing a course ranking based on a particular student type, such as math majors, the ranking may recommend the second course over the first course. This situation may occur where students outside of a particular area of study take courses within that area of study. For example, an English major may perform worse on a follow-up math courses than a physics major.

In embodiments utilizing student type, methods may include calculating a weight based on the student type, and generating a ranking based on the student-type-specific weight. Other embodiments may instead include sorting student data to isolate grades based on student type and generating a temporary weight based on the student type in order to generate a student-type-specific ranking.

Figure 5:
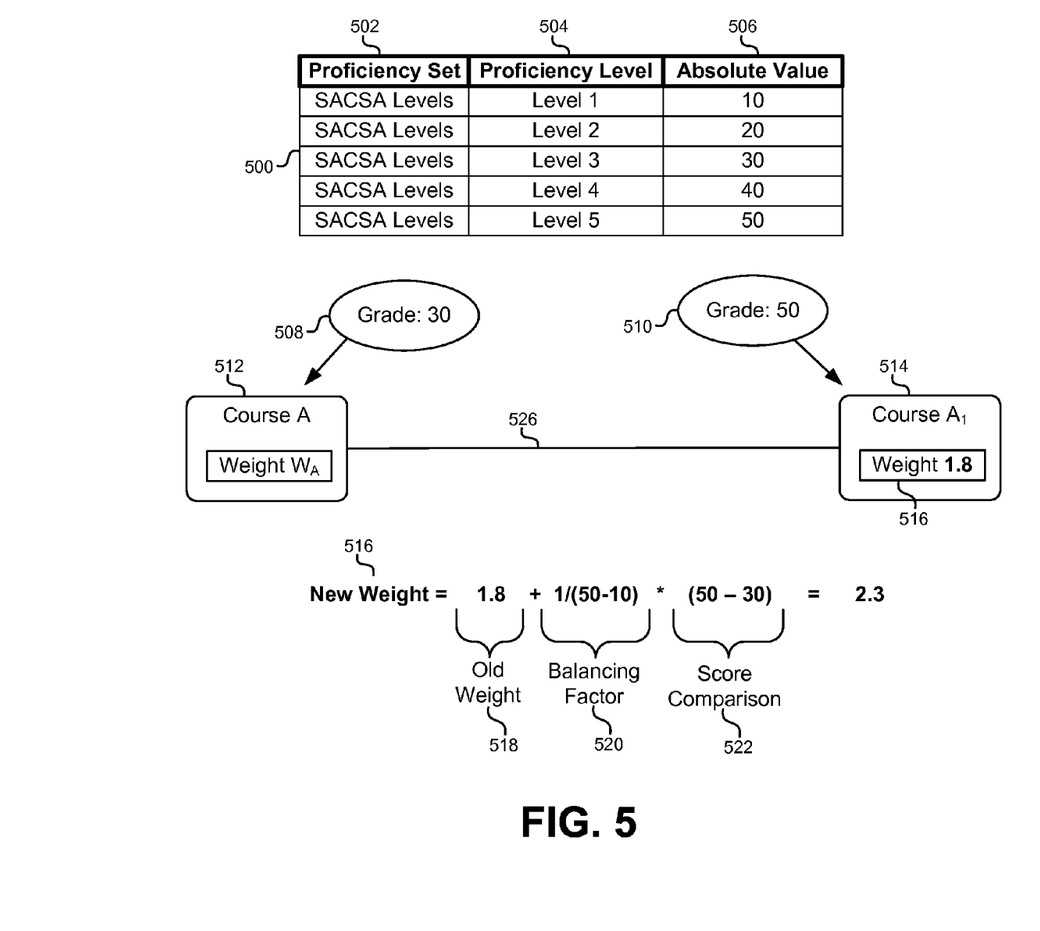
FIG. 5 illustrates a diagram of a weight update process, according to one embodiment.

FIG. 5 illustrates a diagram of a weight update process, according to one embodiment. This diagram illustrates one exemplary method of using student grades to update network node weights. However, the particular equations and methodologies used herein are merely exemplary, and other specific types of equations may be used in light of this disclosure.

After the course network is created, each node therein may be assigned a default weight. In one embodiment, the default weight is 0, while in another embodiment, the default weight is 1. Other defaults may be used based on the needs of the particular embodiment. These weights may be adjusted dynamically as student evaluations are received. Student evaluations may be in the form of a grade. As used herein, a grade may represent any ranking given to a student that is reflective of performance of the course. Any type of grading system may be used, such as a numeric grading system on a 0.0-4.0 scale, a letter grading system, and/or the like. For example, one embodiment may use the South Australian Curriculum Standards and Accountability (SACSA) system to represent a grading level.

Some embodiments may use a translation table 500 to translate between a symbolic proficiency level 504 to an absolute numeric value 506 that may be used in calculations. A translation table 500 may be set up for each proficiency set 502 or grading level system. In this example, each level within the SACSA proficiency set is related to an absolute value ranging from 10 to 50.

Continuing with this example, it may be assumed that a student previously enrolled in Course A represented by node 512. The same student may then have enrolled in Course $A_1$ represented by node 514. Node 512 may be related to node 514 through connection 526. Connection 526 may represent a parent-child relationship between node 512 (parent) and node 514 (child). Node 512 and node 514 may be part of a larger node network representing a plurality of courses. After completing Course A, the student may receive a grade represented by the SACSA proficiency level 3. This grade may be translated into an absolute numerical value of 30. The same student may next complete Course $A_1$ and may receive a grade represented by the SACSA proficiency level 5. In other words, a plurality of nodes may represent the first course and the second course, and a first grade may be received for the first course, as well as a second grade for the second course.

After receiving these two grades, the system may update the weight 516 associated with node 514. It will be understood that many different mathematical and/or logical operations may be used to update the weight 516. In one embodiment, the weight 516 be adjusted using the first grade and the second grade. For example, a sum of the two grades may be computed and used to adjust the weight 516. In other embodiments, an average of the two grades may be used. In the example of FIG. 5, a difference between the two grades may be used. In particular, a difference between the two grades may be a way of measuring a change in the student's performance when moving between courses. By subtracting the second grade from the first grade, a positive difference may suggest that a student's performance has improved by following this particular course trajectory. In contrast, a negative difference may suggest that the student's performance has declined by following this particular course trajectory. By determining that the first grade is higher than the second grade, the weight 516 of node 514 may be reduced, suggesting that students should not take the course represented by node 514 if other courses are rated higher.

The comparison 522 between the two grades may be computed as a ratio that can be multiplied with the old weight 518 to generate a new weight 516. In other embodiments, the score comparison 522 may be computed as a scalar that is added to or subtracted from the old weight 518. In some embodiments, a balancing factor 520 may be used to scale the score comparison 522 such that the score comparison 522 adjusts the old weight 518 by a desired amount. The balancing factor may be any number chosen through experimentation with the particular grade score range. In some embodiments, the balancing factor may be based on the score range. For example, the balancing factor may be calculated using a difference between the minimum and maximum possible scores. In the particular embodiment of FIG. 5, the balancing factor may be computed by taking the inverse of the difference between the maximum score value (50) and the minimum score value (10). The particular equation shown in FIG. 5 is merely exemplary. Other combinations of the grades, factors, and/or weights described above may be used by other embodiments.

In some embodiments, the process described above for updating the weight of a particular node may be carried out for each student grade received by the system. Each new weight calculated based on an individual student grade may be combined with an existing weight. For example, each new weight may be averaged with the existing weight to generate a new way to be assigned to the particular node. In other embodiments, each new weight calculated may be averaged with a sliding window of historical weights of a predetermined length.

In some embodiments, the process may be modified to account for students who perform significantly better or significantly worse than the remaining population. For example, some students made be determined to perform well in any course trajectory. It may then be assumed that their performance should not alter the weight of courses within their particular chosen course trajectory. Other students may be determined to perform considerably poorer than the remaining student population regardless of their particular course trajectory. These student scores may also be eliminated from the weight update process.

Figure 6:
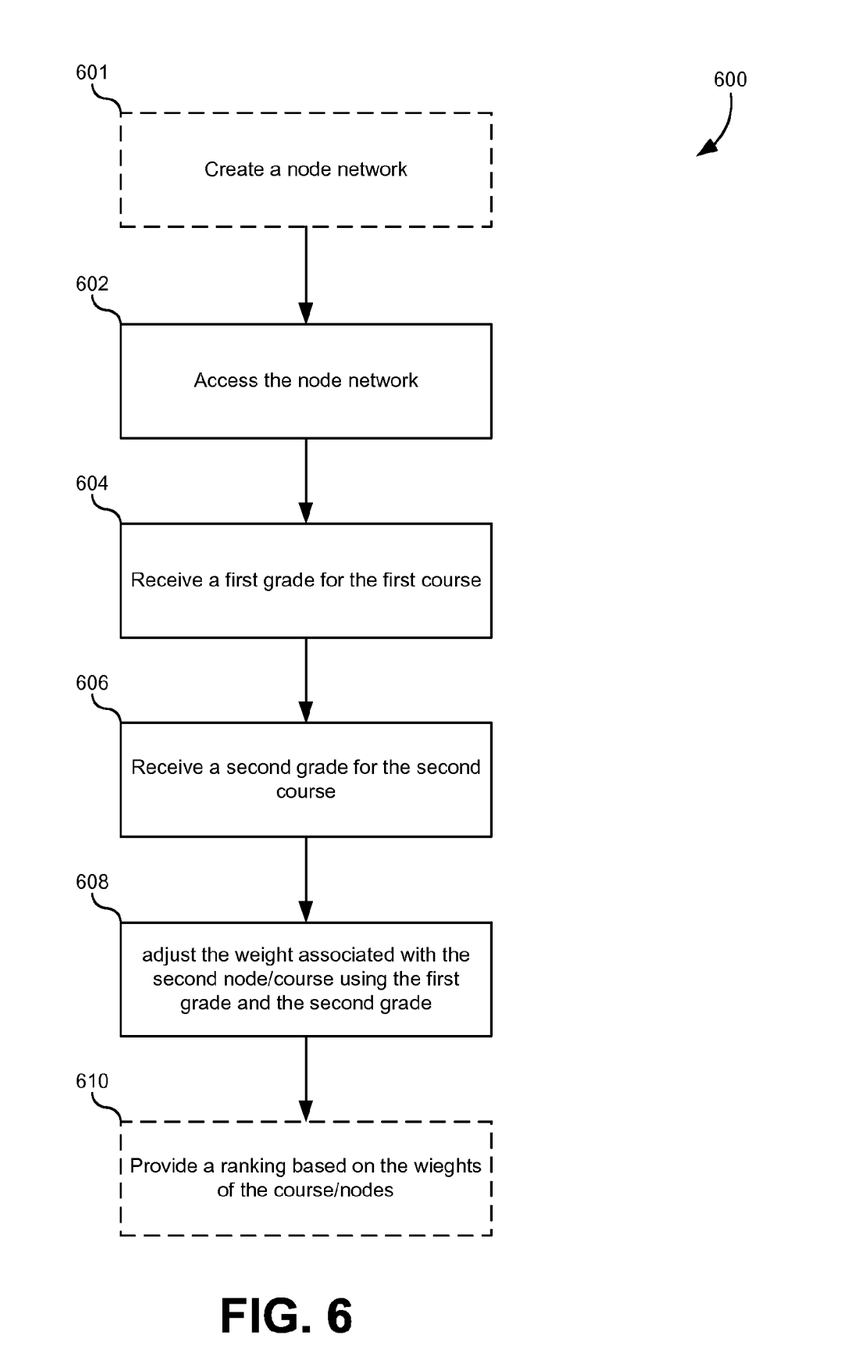
FIG. 6 illustrates a flowchart of a method for computing network node adjustments, according to one embodiment.

FIG. 6 illustrates a flowchart 600 of a method for computing network node adjustments, according to one embodiment. The method may include creating a node network (601). The node network may include the represented using a data structure comprising a nodes representing courses or course offerings. The data structure may be a tree data structure that is organized into a plurality of parent-child relationships. A weight may be associated with each node in the data structure. In some embodiments, the weights of the nodes may be initialized to 0.

The method may also include accessing the node network (602). Accessing the node network may include accessing a first node representing a first course. A plurality of nodes may be related to the first node in a parent-child relationship where each of the plurality of nodes is a child of the first node. In one embodiment, the plurality of nodes may comprise a second node representing a second course. The first course and the second course may represent courses taken by a particular student. In some embodiments, the course represented by the first node may comprise a prerequisite for each of the courses represented by the plurality of nodes.

The method may also include receiving a first grade for the first course (604). The method may additionally include receiving a second grade for the second course (606). These grades may be received upon completion of the course, such as at the end of a semester. The grades may be entered by a teacher or registrar. In some embodiments, the grades may be entered in real-time by the student in order to generate a ranking, such that the system need not store student grades or need to have access to a student record.

The method may further include adjusting the weight associated with the second node using the first grade and the second grade. For example, the method may include determining that the first grade is higher than the second grade and reducing the weight associated with the second node. Similarly, the method may include determining that the first grade is lower than the second grade and increasing the weight associated with the second node. Some embodiments may also include using a balancing factor to adjust the weight associated with the second node.

Figure 7:
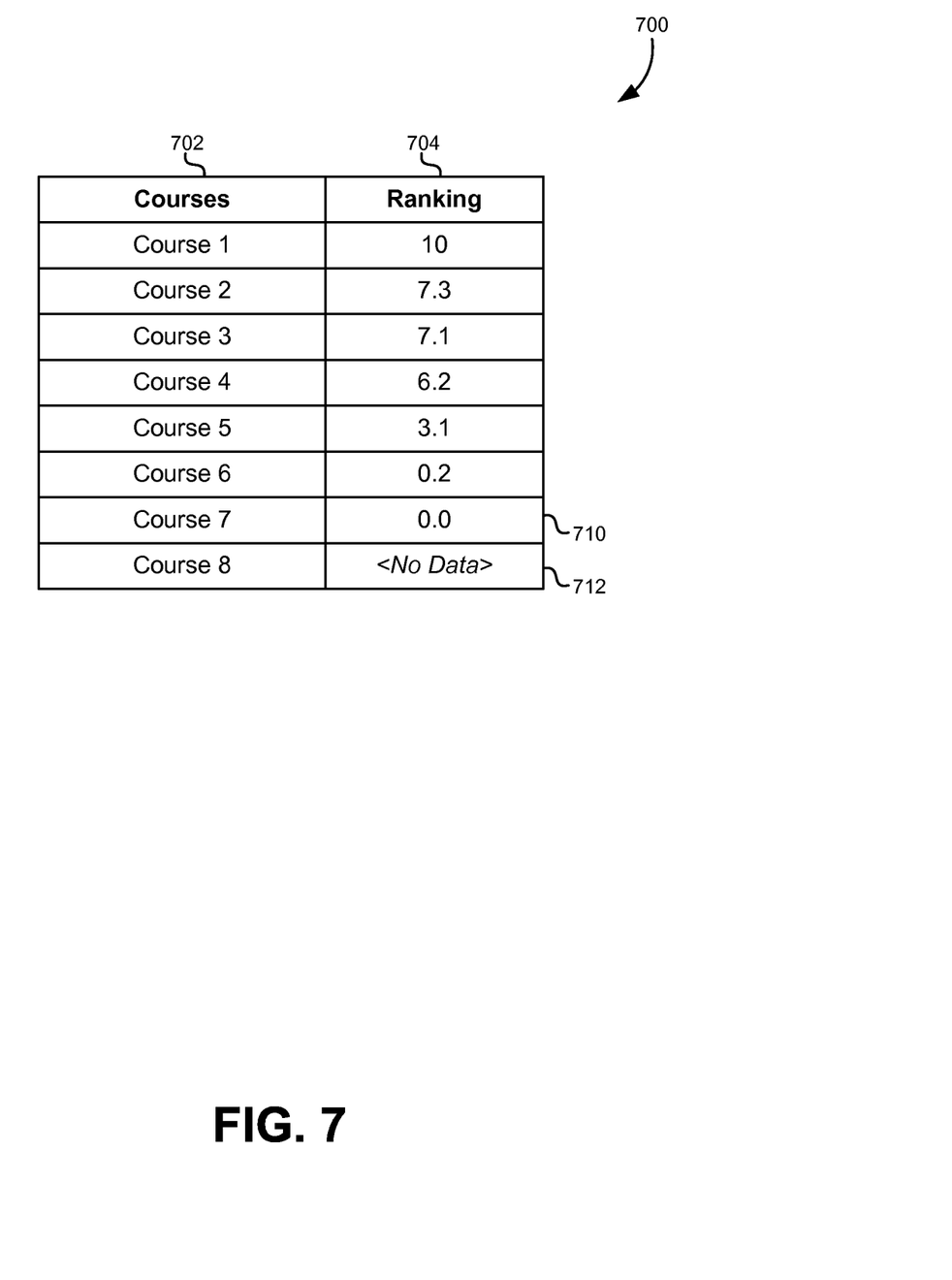
FIG. 7 illustrates a display of a course ranking, according to one embodiment.

The method may additionally include providing a ranking based on the weights of the nodes (610). FIG. 7 illustrates a display 700 of a course ranking, according to one embodiment. The method may cause a display device to display a list 702 of the plurality of courses available to the student after taking the first course. The second course may be included in the list of courses 702. A ranking 704 may be displayed that is based on the weight of each of the plurality of courses. In one embodiment, the ranking may include a number that is derived from the weight, or alternatively may include a numeric representation of the weight itself. In some embodiments, absolute values of the weights may be scaled or translated to a well understood ranking system, such as 1 through 10. In some embodiments, a numerical ranking 704 need not be displayed at all. Instead, the list 702 of courses may be presented in an order based on the ranking without displaying the ranking.

Some embodiments may determine that no students have followed a particular course trajectory that includes one or more of the plurality of courses. In other words, it may be determined that a no student taking the first course has completed one of the courses in the list 702 of courses. Normally, the ranking would display a value based on a 0 weight (or other default value). In this case, an indication 712 may be presented that communicates that no students have taken this course following the first course. This may be used to distinguish other courses having the 0 weight (or other default value) where students have enrolled but done poorly.

It should be appreciated that the specific steps illustrated in FIG. 6 provide particular methods of computing relative rankings for multiple course trajectories according to various embodiments of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
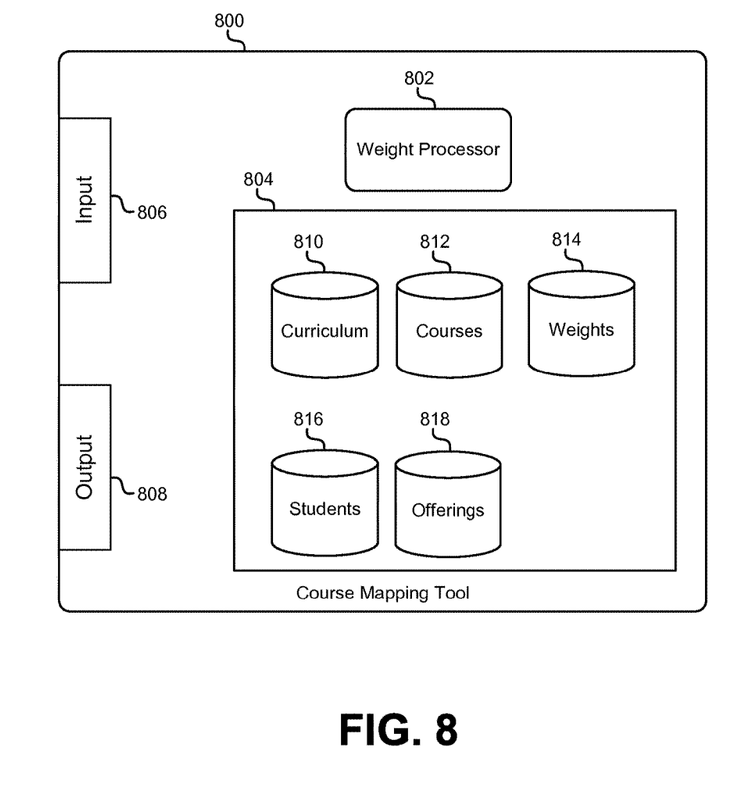
FIG. 8 illustrates a block diagram of a system for computing network node adjustments, according to one embodiment.

FIG. 8 illustrates a block diagram 800 of a system for computing network node adjustments, according to one embodiment. As described above, the methods and systems described herein may be implemented using a general purpose computer system and/or a network computer environment, such as those described in relation to FIG. 1 and FIG. 2. In other embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. Block diagram 800 represents an abstraction of the functions that may be implemented using these types of hardware. After reading this disclosure, one having skill in the art could use these well-known circuit elements to construct the device shown in FIG. 8 to implement these methods and systems.

The dedicated hardware may include a mass storage element 804, such as a disk array or database hardware structure. The mass storage element 804 may be physically or logically subdivided into a number of different storage areas. For example, the mass storage element 804 may include a curriculum database 810, a course database 812, a weight database 814, a student database 816, and/or a course offering database 818. Each of these databases may be included in one physical disk structure, or they may each be separated into different hardware memory elements.

The dedicated hardware may also include an input port 806 and an output port 808. These ports may receive transmissions representing grades, student identifiers, course offerings, and/or the like. These ports may also provide outputs to be displayed by a hardware display system to provide a ranking of courses to a student on a display device. The input port 806 and the output port 808 may be implemented using an Ethernet port, a serial port, a USB port, and/or the like.

The dedicated hardware may also include a weight processor 802. The weight processor 802 may be implemented using an FPGA, an EEPROM, a lookup table, or other digital logic circuits discreetly arranged to implement the processes described above. This hardware may be specifically designed to run the weight update process, and need not include any software instructions. The weight processor 802 may receive data retrieved over a data bus from the mass storage element 804 and perform computations and logical operations to produce new weights based on retrieved data, such as weights and grades provided through the input port 806. The weight processor 802 may also generate a list of ranked courses that are sent as a data packet through the output port 808 to a display device. The dedicated hardware described in FIG. 8 can also be integrated with the student learning system 312 of FIG. 3.

In one embodiment, the various modules and systems in FIG. 8 may operate as separate computer systems. Alternatively, multiple modules may be combined on the same or similar computer systems. In addition, some modules may be combined together into a single hardware module performing the functions of both individual hardware modules. For example, the curriculum database 810 may be combined with the course database 812 as a single hardware element. Similarly, a single module may be split into multiple modules. It will be understood in light of this disclosure that any arrangement of the hardware modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of computing relative rankings for multiple course trajectories, the method comprising:
    accessing a data structure comprising:
        a first node representing a first course; and
        a plurality of nodes representing courses that are available after completing the first course, wherein:
            each of the plurality of nodes is associated with a weight; and
            the plurality of nodes comprises a second node representing a second course;
    receiving a first grade for a student for the first course;
    receiving a second grade for the student for the second course;
    adjusting the weight associated with the second node using the first grade and the second grade; and
    providing a ranking of the plurality of courses using the weights of the plurality of courses.

2. The method of claim 1 wherein:
    the data structure comprises a tree data structure that is organized into a plurality of parent-child relationships; and
    each of the plurality of nodes is a child of the first node.

3. The method of claim 2 wherein the course represented by the first node comprises a prerequisite for each of the courses represented by the plurality of nodes.

4. The method of claim 1 wherein adjusting the weight comprises:
    determining that the first grade is higher than the second grade; and
    reducing the weight associated with the second node.

5. The method of claim 1 wherein adjusting the weight comprises:
    determining that the first grade is lower than the second grade; and
    increasing the weight associated with the second node.

6. The method of claim 1 further comprising using a balancing factor to adjust the weight associated with the second node.

7. The method of claim 1 wherein the ranking of the plurality of courses comprises a relative recommendation of courses after the first course.

8. The method of claim 1 further comprising causing the courses associated with each of the plurality of nodes to be displayed in an order based on the rankings.

9. The method of claim 8 further comprising:
    determining that no students have enrolled in a third course associated with a third node; and
    causing an indication to be displayed communicating that no students have enrolled in the third course instead of displaying the weight associated with the third node.

10. A computer-readable memory comprising a sequence of instructions which, when executed by one or more processors, causes the one or more processors to compute relative rankings for multiple course trajectories by:
    accessing a data structure comprising:
        a first node representing a first course; and
        a plurality of nodes representing courses that are available after completing the first course, wherein:
            each of the plurality of nodes is associated with a weight; and
            the plurality of nodes comprises a second node representing a second course;
    receiving a first grade for a student for the first course;
    receiving a second grade for the student for the second course;
    adjusting the weight associated with the second node using the first grade and the second grade; and
    providing a ranking of the plurality of courses using the weights of the plurality of courses.

11. The computer-readable memory according to claim 10 wherein:
    the data structure comprises a tree data structure that is organized into a plurality of parent-child relationships; and
    each of the plurality of nodes is a child of the first node.

12. The computer-readable memory according to claim 11 wherein the course represented by the first node comprises a prerequisite for each of the courses represented by the plurality of nodes.

13. The computer-readable memory according to claim 10 wherein adjusting the weight comprises:
    determining that the first grade is higher than the second grade; and
    reducing the weight associated with the second node.

14. The computer-readable memory according to claim 10 wherein adjusting the weight comprises:
    determining that the first grade is lower than the second grade; and
    increasing the weight associated with the second node.

15. The computer-readable memory according to claim 10 wherein the instructions further cause the one or more processors to compute relative rankings for multiple course trajectories by using a balancing factor to adjust the weight associated with the second node.

16. A system comprising:
    one or more processors; and
    a memory communicatively coupled with and readable by the one or more processors and comprising a sequence of instructions which, when executed by the one or more processors, cause the one or more processors to compute relative rankings for multiple course trajectories by:
    accessing a data structure comprising:
        a first node representing a first course; and
        a plurality of nodes representing courses that are available after completing the first course, wherein:
            each of the plurality of nodes is associated with a weight; and
            the plurality of nodes comprises a second node representing a second course;
    receiving a first grade for a student for the first course;
    receiving a second grade for the student for the second course;
    adjusting the weight associated with the second node using the first grade and the second grade; and
    providing a ranking of the plurality of courses using the weights of the plurality of courses.

17. The system of claim 16 wherein:
    the data structure comprises a tree data structure that is organized into a plurality of parent-child relationships; and
    each of the plurality of nodes is a child of the first node.

18. The system of claim 17 wherein the course represented by the first node comprises a prerequisite for each of the courses represented by the plurality of nodes.

19. The system of claim 16 wherein adjusting the weight comprises:
- determining that the first grade is higher than the second grade; and
- reducing the weight associated with the second node.

20. The system of claim 16 wherein the instructions further cause the one or more processors to compute relative rankings for multiple course trajectories by using a balancing factor to adjust the weight associated with the second node.

\* \* \* \* \*

UNITED STATES PATENT AND TRADEMARK OFFICE
CERTIFICATE OF CORRECTION

PATENT NO. : 10,394,767 B2
APPLICATION NO. : 13/826042
DATED : August 27, 2019
INVENTOR(S) : Bhalla et al.

It is certified that error appears in the above-identified patent and that said Letters Patent is hereby corrected as shown below:

In the Specification

In Column 10, Line 41, delete "may may" and insert -- may make --, therefor.

Signed and Sealed this
Twenty-fifth Day of August, 2020

Andrei Iancu
*Director of the United States Patent and Trademark Office*